:::
United States Patent Office 3,060,175
Patented Oct. 23, 1962

3,060,175
NEW METHOD OF HYDROXYLATING STEROIDS AND PRODUCTS RESULTING THEREFROM
Victor E. Origoni, Emerson, and Michael Marx, Leonia, N.J., assignors to American Cyanamid Company, New York, N.Y., a corporation of Maine
No Drawing. Filed May 22, 1961, Ser. No. 111,466
19 Claims. (Cl. 260—239.55)

This invention relates to new methods for the hydroxylation of steroids. More particularly it relates to a process of hydroxylating ring D and side chain attached to ring D of steroids of the pregnane series and novel intermediates produced in the process.

In the prior art, descriptions of standard techniques for introducing oxygen functions, vital to cortisone like activity, in ring D and side chain of steroids of the pregnane series, involve a multiplicity of chemical and/or microbiological operations which frequently: (a) do not yield a high percentage of the desired compound, (b) require complicated step-wise reactions, and (c) require expensive and time-consuming fermentations. This is particularly true of reactions involving hydroxylation at the 16-, 17- and 21-positions; which reactions have been studied exhaustively in the past without any great degree of success.

We have now unexpectedly found that simultaneous introduction of oxygen functions at steroid positions 16-, 17- and 21- of $\Delta^{16}$-20-one steroids of the pregnane series can be accomplished by means of a simple and efficient chemical reaction sequence which results in good yields of the desired 16α,17α-dihydroxy-20-keto-21-alkanoyloxy steroids. The $\Delta^{16}$-20-one starting compounds of the present invention are readily available from plant (sapogenin) and animal (bile acid) steroid sources.

The process of the present invention may be represented by the following partial steroid structures which show the transformations taking place:

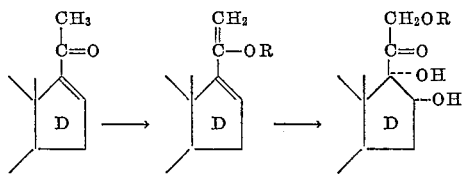

in which R is a lower alkanol radical.

The process of this invention involves the permanganate oxidation of the 20-enol alkanoate of a C–21 unsubstituted $\Delta^{16}$-20-one steroid of the pregnane series. In the preferred embodiment of this invention, a solution of the starting compound, a $\Delta^{16}$-20-one steroid of the pregnane series in a lower alkenyl lower alkanoate containing an acid catalyst such as, for example, p-toluenesulfonic acid, sulfuric acid, benzenesulfonic acid, perchloric acid, etc. is subjected to fractional distillation for a period ranging from about 4 to about 20 hours; the time depending both on the rate of distillation and the particular steroid starting material employed. Generally, the reaction is substantially complete within a period of about 7 hours. The reaction mixture is then neutralized with a mild alkali such as, a metal bicarbonate and the resulting enol alkanoate isolated by concentration of the reaction mixture and crystallization from a suitable solvent. The enol alkanoate is then dissolved in a water-miscible organic solvent, such as dioxane, acetonitrile, N,N-dimethylformamide, etc., stable to metal permanganates and preferably containing a small amount of a lower alkanoic acid, and oxidized by treatment with a solution of a metal permanganate in a mixture of water and the said water-miscible organic solvent. The metal permanganates can be, for example, sodium or potassium or any having solubility in water-organic solvent mixtures. One of the preferred specific embodiments of the invention is to use a solution of at least two equivalents, based on steroid, of an alkali metal permanganate in aqueous acetone, and an acetone-acetic acid mixture as the steroid solvent. Reaction is substantially complete in a period from about 20 minutes to about 2 hours. Any excess permanganate is reduced by the addition of sulfur dioxide or a suitable sulfite salt, the precipitated manganese salts removed by filtration and the desired 21-lower alkanoate-16α,17α-dihydroxy-20-one steroid of the pregnane series isolated by reduced pressure concentration of the filtrate. A solution of the 21-lower alkanoate can be easily hydrolyzed by methods well known in the art, for example, by means of an alkali metal hydroxide or carbonate to yield the 16α,17α,21-trihydroxylated free alcohol steroid. The permanganate oxidation can be run at temperatures ranging from about −15° C. to +50° C. but optimum results are achieved within a range of from about 0° C. to 15° C.

Some of the specific embodiments of the present invention can be illustrated by the following flowsheet.

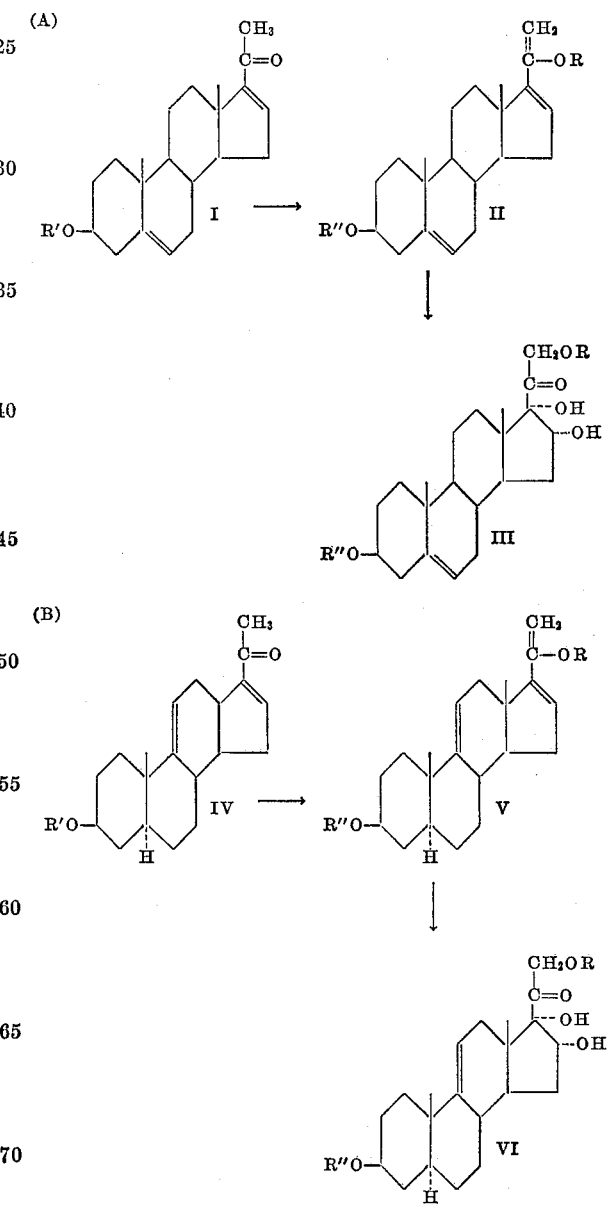
:::

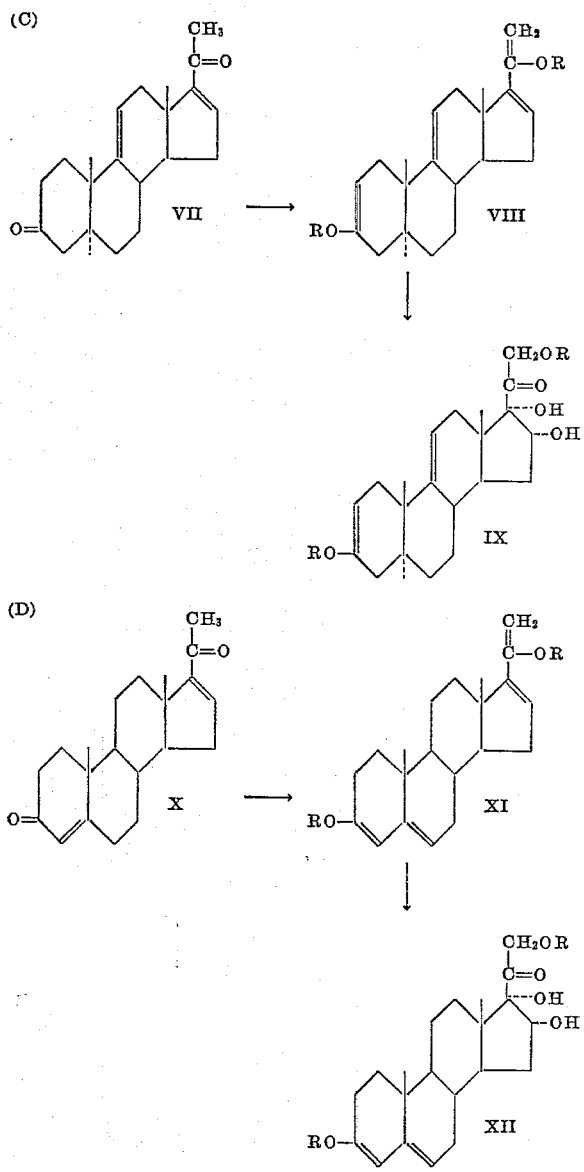

In the above reactions, R is a lower alkanoyl radical, R' is hydrogen or a lower alkanoyl radical, and R" and R are the same when R' is hydrogen and R" and R' are the same when R' is lower alkanoyl.

The reaction, according to the present invention, has general utilization. It can be applied to steroids of the pregnane series such as, for example, pregnenes, pregnadienes, pregnatrienes, etc. and to steroids containing, at other positions of the molecule, protected or unprotected hydroxyl groups or other substituents, such as free or substituted carbonyl groups, halogens, alkyl groups and the like. The compounds obtained according to the process of the present invention can be converted relatively easily to known compounds which are adrenal cortical hormones or to compounds which are useful as anti-inflammatory agents. For example, the final product of Example 2 can be converted by methods well known in the steroid art to 9α-fluoro-11β,21-dihydroxy-1,4-pregnadiene 3,20-dione-16α,17α-acetonide and this in turn when treated with dilute formic acid gives the corresponding 16α,17α-dihydroxy steroid, triamcinolone. Both of these compounds possess high glucocorticoid and anti-inflammatory activity.

The specific examples which follow illustrate the process of the present invention and are not to be construed as limitations but as illustrations of the present process.

EXAMPLE I

*Preparation of 3β,21-Diacetoxy-16α,17α-Dihydroxy-5-Pregnen-20-One*

A 5.00 gram quantity of 3β-acetoxy-5, 16-pregnadien-20-one (Δ¹⁶-pregnenolone acetate) is dissolved in 60 ml. isopropenyl acetate containing 0.60 gram of p-toluenesulfonic acid. The mixture is fractionated through a Vigreux column at 97° C. After 4 hours, 35 ml. of solvent are removed and replaced with 25 ml. of fresh isopropenyl acetate. After 7 hours, the reaction mixture is quenched with 5.0 grams of sodium bicarbonate. The isopropenyl acetate is then removed under reduced pressure. The product is crystallized out of a mixture of acetone and water to yield 5.40 grams. The pure enol acetate is obtaind by recrystallization from methanol.

A 1.40 gram portion of the enol acetate is dissolved in 70 ml. of acetone containing 0.28 ml. of glacial acetic acid. The solution is cooled to 0° C. in an ice bath. A 1.18 gram quantity of potassium permanganate (2.1 molar equivalents) is dissolved in 42 ml. of 85 percent aqueous acetone. The permanganate solution is added dropwise to the stirred steroid solution over a 20 minute period. The mixture is then stirred for an additional 30 minutes at 0° C. Excess permanganate is reduced with 0.52 gram of sodium bisulfite in 35 ml. of water and the resulting manganese salts are filtered. Concentration of the quenched reaction mixture to remove acetone causes crystallization. The product is allowed to stand at 0° C. for 3 hours, then filtered, washed with water and dried under reduced pressure to yield 0.44 gram. A second crop of 0.65 gram is obtained by extraction of the filtrate with ethyl acetate. Recrystallization of this material from acetone-petroleum ether gives pure 3β,21-diacetoxy-16α,17α-dihydroxy-5-pregnen-20-one. This material can be deacetylated to produce 3β,16α,17α,21-tetrahydroxy-5-pregnen-20-one.

To show that the intermediate obtained above is convertible to a biologically active compound, a 0.350 gram quantity of 3β,21 - diacetoxy-16α,17α-dihydroxy-5-pregnen-20-one is dissolved in 175 ml. of acetone. Then 0.42 ml. of concentrated hydrochloric acid is added and the reaction mixture is allowed to stand at room temperature (26±5° C.) for approximately 16 hours. At the end of this reaction period, the mixture is neutralized with 21 ml. of saturated sodium bicarbonate and 56 ml. of water. The acetone fraction is concentrated under reduced pressure to approximately 100 ml. The crystals are allowed to stand at 0° C. for 2 hours, collected by filtration, washed with water and dried to yield 0.330 gram of 3β, 21 - diacetoxy - 16α,17α-isopropylidenedioxy-5-pregnen-20-one. This product can then be converted [see Mills et al., J. Am. Chem. Soc. 82, 3399 (1960)] to the highly potent cortical steroid 6α,9α-difluoro-11β,16α,17α,21-tetrahydroxy-1,4-pregnadiene-3,20-dione.

EXAMPLE II

*Preparation of 3β,21-Diacetoxy-16α,17α-Dihydroxy-9(11)-Allopregnen-20-One*

A 5.00 gram portion of the compound, 3β-acetoxy-9(11),16-allopregnadien-20-one is dissolved in 400 ml. isopropenyl acetate containing 0.60 gram p-toluenesulfonic acid. The solution is fractionated through a Vigreux column for 9 hours at 97° C. Approximately 70 ml. of distillate are collected. Twenty milliliter aliquots of the solvent are added twice as partial replacements. The infrared curve shows no original material remaining after the 9 hour fractionation. The reaction is quenched with 5.0 grams of sodium bicarbonate and the material evaporated to dryness then washed with 100 ml. of water to remove inorganic salts. The washed product is dried under reduced pressure at 40° C., yielding 5.76 grams of crude compound. Subsequent recrystallization from 30 ml. of methanol produced 4.69 grams of the pure enol acetate, 3β,20-diacetoxy-9(11)-16,20-allopregnatriene.

A 4.50 gram quantity of the enol acetate is dissolved in 225 ml. of acetone containing 0.9 ml. of glacial acetic acid and the solution cooled to 0° C. A solution of 3.68 grams of potassium permanganate in 135 ml. of 85 percent aqueous acetone (85:15 acetone:water) is added over a period of 20 minutes, with stirring, to the enol acetate solution. The reaction is allowed to proceed for an additional 30 minutes at 0° C. to 5° C. Excess permanganate is then reduced with 2.25 grams of sodium bisulfite dissolved in 54 ml. of water and the resulting manganese dioxide filtered and washed with 36 ml. of water. The filtrate is concentrated under reduced pressure at approximately 10° C. to approximately 75 ml., allowed to stand at 0° C. for 2 hours and filtered to remove the crystals. The 3.30 grams of 3β,21-diacetoxy - 16α,17α - dihydroxy - 9(11) - allopregnen - 20 - one thus produced is shown by paper chromatography to be homogeneous and to give a positive reaction with Blue Tetrazolium and to possess no appreciable ultraviolet absorption.

A 2.00 gram portion of 3β,21-diacetoxy-16α,17α-dihydroxy-9(11)-allopregnen-20-one is dissolved in 1000 ml. of acetone plus 2.4 ml. of concentrated hydrochloric acid and allowed to react at room temperature (25°±5° C.) for approximately 16 hours. At the termination of the reaction period, the solution is vacuum-concentrated to approximately 500 ml., then 20 ml. of saturated sodium bicarbonate solution and 150 ml. of water are added. This solution is vacuum-concentrated until crystals begin to form and allowed to stand at 0° C. for 1 hour. The crystals are collected by filtration, washed with water and vacuum-dried to yield 1.65 grams of 3β,21-diacetoxy-9(11) - allopregnen-20-one-16α,17α-acetonide which is shown by paper chromatography to be homogeneous and have the following characteristics: melting point 180°–182° C.; $[\alpha]_D^{22}$ +44.5° (1% CHCl$_3$), $\lambda_{max.}^{KBr}$ 5.66, 5.74, 7.94, shoulder, 8.00, 8.10, 9.60, 11.55μ

1.50 grams of 3β,21-diacetoxy-9(11)-allopregnen-20-one-16α,17α-acetonide is slurried in 100 ml. of ethanol. The material is saponified by treating it with 12.5 ml. of a 3 percent aqueous solution of potassium hydroxide for 2 hours in an inert atmosphere. The product, 3β,21-dihydroxy - 9(11) - allopregnen-20-one-16α,17α-acetonide, weighed 1.18 grams and is shown by paper chromatography to be homogeneous.

A 400 mg. quantity of 3β,21dihydroxy-9(11)-allopregnen-20-one-16α,17α-acetonide is dissolved in 45 ml. of acetone. The resulting solution is cooled to 10° C. Then 0.4 ml. of an oxidation solution consisting of chromium trioxide in sulfuric acid (5.2 grams of chromium trioxide dissolved in 4.6 ml. of concentrated sulfuric acid; volume to 20 ml. with water is added and reacted for 5 minutes at 10° C. Water is added to a total of 90 ml. The solution is allowed to stand at 5° C. for 5 hours, then filtered and the resulting crystals washed with water and vacuum-dried; yielding 310 mg. of 21-hydroxy - 9(11)-allopregnene-3,20-dione-16α,17α-acetonide. This material is shown to be homogeneous by paper chromatography and has the following characteristics: $[\alpha]_D^{25}=+48.0°$ (1% CHCl$_3$), $\lambda_{max.}^{KBr}$ 2.85, 5.82, 8.23, 9.12, 9.54. 11.58μ molecular weight=402.51. On analysis the carbon and hydrogen values agreed closely with the theoretical values for C$_{24}$H$_{34}$O$_5$.

A 250 mg. portion of 21-hydroxy-9(11)-allopregnene-3,20-dione-16α,17α-acetonide is dissolved in 2 ml. of pyridine. A 0.5 ml. volume of acetic anhydride is added and the solution reacted at room temperature (25°±5° C.) for approximately 16 hours. At the termination of this period, the reaction is quenched by means of the addition of 1 ml. of methanol. The solution is evaporated to dryness under reduced pressure and the resulting crystals recrystallized from acetone:water to yield 198 mg. of analytically pure 21-acetoxy-9(11)-allopregnene-3,20-dione-16α,17α-acetonide having the following characteristics: $[\alpha]_D^{25}=+32.5°$ (1%, CHCl$_3$); molecular weight=444.64.

$\lambda_{max.}^{KBr}$ 5.72, 5.78, shoulder 5.83, 8.10, 9.58, 11.62μ

A 100 mg. quantity of 21-acetoxy-9(11)-allopregnene-3,20-dione-16α,17α-acetonide is dissolved in 8.5 ml. of t-butanol. The system is swept with nitrogen gas, then 0.2 ml. of glacial acetic acid plus 110 mg. of selenium dioxide in 0.05 ml. of water are added. The mixture is refluxed at 74°–76° C. for 64 hours. At the end of the reaction period, the solution is cooled, the selenium is filtered off and the solution is evaporated to dryness. Partition chromatography in a water:dioxane, cyclohexane solvent system separated out 28.2 mg. of the desired compound, 21 - actoxy - 1,4,9(11) - pregnatriene - 3,20-dione-16α,17α-acetonide, which is identical with the same compound produced by an alternative route.

EXAMPLE III

*Preparation of 3,21-Diacetoxy-16α,17α-Dihydroxy-2, 9(11)-Allopregnadien-20-One*

A 10.0 gram quantity of 3β-acetoxy-9(11),16-allopregnadien-20-one is hydrolyzed in methanol with dilute (5%) sodium hydroxide solution under a nitrogen atmosphere at room temperature (25°±5° C.) for two hours. The reaction mixture is worked up by a neutralization, and crystallization by addition of sodium chloride solution.

A 9.00 gram quantity of 3β-hydroxy-9(11),16-allopregnadien-20-one obtained above is dissolved in 400 ml. of acetone. Then 9.0 ml. of a solution of chromium trioxide in sulfuric acid (5.2 g. chromium trioxide in 4.6 ml. sulfuric acid; diluted to a total volume of 20 ml. with water) are added and the reaction allowed to proceed for 8 minutes at 20° C. The reaction is quenched with water (170 ml. needed for crystallization to occur). The mixture is allowed to stand for ½ hour and then an additional 230 ml. of water is added. The mixture is allowed to stand an additional hour at 5° C. Filtration of the mixture and water wash yields 8.16 grams of 9(11),16-allopregnadiene-3,20-dione which is homogeneous by paper chromatography and infrared analysis.

A 7.50 gram quantity of 9(11),16-allopregnadiene-3,20-dione is enol acetylated with isopropenyl acetate and p-toluenesulfonic acid by standard procedures to produce 6.34 grams of pure 3,20-diacetoxy-2,9(11),16,20-allopregnatetraene. A 6.0 gram quantity of the desired starting material, 3,20-diacetoxy-2,9(11),16,20-allopregnatetraene; obtained as described above; is dissolved in 240 ml. of acetone. The solution is cooled to 5° C. and 1.5 ml. of glacial acetic acid is added. A solution of 4.91 grams of potassium permanganate in 180 ml. of 15% aqueous acetone is added slowly to the stirred solution over a 15 minute period. The reaction is allowed to proceed for an additional 30 minutes at 5° C. The excess potassium permanganate is then reduced with sodium bisulfite solution and the manganese salts filtered off. The addition of 100 ml. of water and concentration under reduced pressure to remove acetone yields the dihydroxy enol diacetate crystals. The mixture is allowed to stand at 0° C. for 2 hours, filtered, water washed and dried under reduced pressure at 40° C. The yield is 4.98 grams of the product, 3,21-diacetoxy-16α,17α-dihydroxy-2,9-(11)-allopregnadien-20-one. Paper chromatography and infrared tests demonstrate, respectively, homogeneity and the presence of 16α,17α-diol and 21-acetate groups. Acetylation in acetic anhydride: pyridine yields the 3,16α,21-triacetate in 92% yield.

A mild acid hydrolysis results in deenolization of the A-ring; forming 16α,21-diacetoxy-17α-hydroxy-9(11)-allopregnene-3,20-dione and illustrating the fact that permanganate oxidation in this instance does not affect the A-ring enol acetate.

EXAMPLE IV

*Preparation of 3,21-Diacetoxy-16α,17α-Dihydroxy-3,5-Pregnadien-20-One*

Following the process of Example II, a solution of 1.0 gram of 4,16-pregnadiene-3,20-dione and 0.15 gram of p-toluenesulfonic acid monohydrate in 20 ml. of isopropenyl acetate is slowly distilled for 7 hours. The reaction mixture is neutralized with 1.0 gram of solid sodium bicarbonate, the solvent removed by evaporation under reduced pressure and the residue extracted with benzene. The benzene extracts are purified by chromatography over Florisil (diatomaceous earth). The residue obtained on evaporation of the eluate is crystallized from methanol to give 3,20-diacetoxy-3,5,16,20-pregnatetraene.

To a stirred solution of 400 mg. of the above tetraene diacetate in 25 ml. of acetone and 0.15 ml. of glacial acetic acid at 0° C., there is added, dropwise, a solution of 330 mg. of potassium permanganate in 25 ml. of 85% aqueous acetone. The solution is stirred for 60 minutes after permanganate addition, excess permanganate reduced with aqueous sodium bisulfite, the precipitated manganese salts removed by filtration, the filtrate diluted with 10 ml. of water and concentrated under reduced pressure to precipitate an oily material. The mixture is extracted with methylene chloride, the extracts washed with saturated aqueous sodium chloride, dried over magnesium sulfate and concentrated to dryness under reduced pressure. The resulting residue is crystallized from aqueous methanol to give 3,21-diacetoxy-16α,17α-dihydroxy-3,5-pregnadien-20-one.

A solution of 80 mg. of the above diacetate in 20 ml. of 0.1 N methanolic hydrochloric acid is stirred for 30 minutes at room temperature (25°±5° C.). The solution is diluted with 10 ml. of pyridine, evaporated to near dryness under reduced pressure and the residue (a mixture of 16α,17α,21-trihydroxy-4-pregnene-3,20-dione and 21-acetoxy-16α,17α-dihydroxy-4-pregnene-3,20-dione) is treated for 16 hours with a mixture of 1 ml. of pyridine and 1 ml. of acetic anhydride. The acetylation mixture is quenched with 2 ml. of methanol and evaporated to dryness under reduced pressure and the residue chromatographed on a Florisil (diatomaceous earth) column. Elution with petroleum ether-acetone (85:15), followed by evaporation of the eluate and crystallization from petroleum ether-acetone yields the known 16α,21-diacetoxy-17α-hydroxy-4-pregnene-3,20-dione.

EXAMPLE V

*Preparation of 16α,17α,21-Trihydroxy-6α-Methyl-4-Pregnene-3,20-Dione*

Following the process of Example II, a solution of 2 grams of 6α-methyl-4,16-pregnadiene-3,20-dione and 0.35 grams of p-toluenesulfonic acid monohydrate in 40 ml. of isopropenyl acetate is slowly distilled for 9 hours. The reaction mixture is neutralized with 2.0 grams of solid sodium bicarbonate, the solvent removed by evaporation under reduced pressure and the residue extracted with dichloromethane. The extracts are purified by passage over Florisil (diatomaceous earth), and the residue obtained on evaporation of the eluates is crystallized from methanol to give 3,20-diacetoxy-6-methyl-3,5,16,20-pregnatetraene.

To a stirred solution of the tetraene dienol acetate (800 mg.) in 50 ml. of acetone and 0.3 ml. of glacial acetic acid at 0° C., there is added, dropwise, a solution of 635 mg. of potassium permanganate in 50 ml. of 85% aqueous acetone. The solution is stirred for 40 minutes after permanganate addition, excess permanganate reduced with aqueous sodium bisulfite, the precipitated manganese salts removed by filtration, the filtrate diluted with water and concentrated under reduced pressure to precipitate 3,21-diacetoxy-16α,17α-dihydroxy-6-methyl-3,5-pregnadien-20-one. The product is extracted with methylene chloride, and the extracts concentrated to dryness under reduced pressure. The resulting residue is treated for 2 hours at room temperature with 50 ml. of 2 N methanolic perchloric acid, the solution neutralized by addition of saturated aqueous sodium bicarbonate, and the neutralized solution concentrated under reduced pressure to precipitate the product, 16α,17α,21-trihydroxy-6α-methyl-4-pregnene-3,20-dione.

EXAMPLE VI

*Preparation of 9α-Fluoro-16α,17α,21-Trihydroxy-4-Pregnene-3,11,20-Trione*

A solution of 1.3 grams of 9α-fluoro-4,16-pregnadiene-3,11,20-trione [prepared by chromic oxide/pyridine oxidation of the corresponding 11β-hydroxy compound—see Bernstein et al., J. Am. Chem. Soc. 81, 4956 (1959)] in 30 ml. of isopropenyl acetate containing 0.30 gram of p-toluenesulfonic acid is converted by the process of Example II to the dienol acetate, 3,20-diacetoxy-9α-fluoro-3,5,16,20-pregnatetraen-11-one.

To a stirred solution of 450 mg. of the above tetraene diacetate in 30 ml. of acetone and 0.15 ml. of glacial acetic acid at 0° C., there is added, dropwise, a solution of 340 mg. of potassium permanganate in 30 ml. of 85% aqueous acetone. The solution is stirred for 40 minutes after permanganate addition, excess permanganate then reduced with aqueous sodium bisulfite, the precipitated manganese salts removed by filtration, the filtrate diluted with water and concentrated under reduced pressure until the product, 3,21-diacetoxy-9α-fluoro-16α,17α-dihydroxy-3,5-pregnadiene-11,20-dione, begins to precipitate from solution. The solution is extracted with methylene chloride and the methylene chloride extracts evaporated to dryness under reduced pressure. The residue is dissolved in methanol and hydrolyzed with aqueous potassium carbonate under nitrogen to give crystalline 9α-fluoro-16α,17α,21-trihydroxy-4-pregnene-3,11,20-trione.

We claim:

1. A process for the simultaneous 16α,17α,21-hydroxylation of a steroid compound of the pregnane series which comprises forming the 20-enol alkanoate of a C-16, C-21 unsubstituted $\Delta^{16}$-20-one steroid of the pregnane series by reacting said steroid with a lower alkenyl lower alkanoate and an acid catalyst, subsequently oxidizing said enol alkanoate with an alkali metal permanganate and recovering therefrom a steroid of the pregnane series containing free hydroxyl groups at positions C-16α and C-17α, a carbonyl function at C-20, and an alkanoyloxy group at C-21, said alkanoyloxy group corresponding to the alkanoyl portion of said 20-enol alkanoate.

2. A process for the preparation of unsaturated steroids having in ring D, the formula:

in which R is a lower alkanoyl radical which comprises reacting the corresponding C-21 unsubstituted $\Delta^{16}$-20-keto steroid with a lower alkenyl lower alkanoate and an acid catalyst to produce the corresponding $\Delta^{16}$-20-enol lower alkanoate and subsequently oxidizing with an alkali metal permanganate to produce said 16α,17α-dihydroxy steroid and recovering said compound therefrom.

3. In a process for preparing 16α,17α-dihydroxy-21-lower alkanoyloxy steroids of the pregnane series from the corresponding $\Delta^{16}$-20-keto steroids, the step which comprises oxidizing a $\Delta^{16}$-20-enol lower alkanoate steroid of the pregnane series with an alkali metal permanganate in a mixture of water, a water-miscible organic solvent, and a lower alkanoic acid and recovering said compound therefrom.

4. A process according to claim 3 wherein the alkali metal permanganate is potassium permanganate and the water-miscible organic solvent is acetone.

5. A process according to claim 3 wherein the water-miscible organic solvent is acetone and the lower alkanoic acid is acetic acid.

6. A process of preparing 3β,21-diacetoxy-16α,17α-dihydroxy-5-pregnen-20-one which comprises heating 3β-acetoxy-5,16-pregnadiene-20-one in isopropenyl acetate in the presence of p-toluenesulfonic acid and subsequently contacting the reaction product with potassium permanganate in water and a water-miscible solvent, reducing the excess permanganate and recovering the product therefrom.

7. A process of preparing 3β,21-diacetoxy-16α,17α-dihydroxy-9(11)-allopregnen-20-one which comprises heating 3β-acetoxy-9(11),16-allopregnadiene-20-one with isopropenyl acetate in the presence of p-toluenesulfonic acid and subsequently contacting the reaction product thereof with an alkali metal permanganate in a mixture of water and a water-miscible solvent and recovering said product therefrom.

8. A process of preparing 3,21-diacetoxy-16α,17α-dihydroxy-2,9(11)-allopregnadien-20-one which comprises heating 9(11),16-allopregnadiene-3,20-dione with isopropenyl acetate in the presence of p-toluenesulfonic acid and contacting the reaction product thereof with an alkali metal permanganate in a mixture of water and a water-miscible solvent and recovering said product therefrom.

9. A process of preparing 3,21-diacetoxy-16α,17α-dihydroxy-3,5-pregnadien-20-one which comprises heating 4,16-pregnadiene-3,20-dione with isopropenyl acetate in the presence of p-toluenesulfonic acid and contacting the product resulting therefrom with an alkali metal permanganate in aqueous acetone and recovering said product therefrom.

10. A compound of the formula:

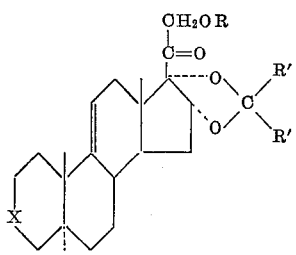

in which R is a member of the group consisting of hydrogen and lower alkanoyl radicals, R' is a lower alkyl radical and X is a member of the group consisting of

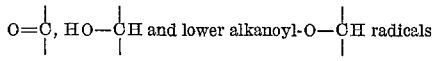

11. The compound 3β,20-diacetoxy-9(11),16,20-allopregnatriene.

12. The compound 3β,21-diacetoxy-16α,17α-dihydroxy-9(11)-allopregnen-20-one.

13. The compound 21-hydroxy-16α,17α-isopropylidenedioxy-9(11)-allopregnene-3,20-dione.

14. The compound 9(11),16-allopregnadiene-3,20-dione.

15. The compound 3,20-diacetoxy-2,9(11),16,20-allopregnatetraene.

16. The compound 3,16α,21-triacetoxy-17α-hydroxy-2,9(11)-allopregnadien-20-one.

17. The compound 16α,21 - diacetoxy-17α-hydroxy-9,(11)-allopregnene-3,20-dione.

18. The compound 3,20-diacetoxy-3,5,16,20-pregnatetraene.

19. The compound 3,21-diacetoxy-16α,17α-dihydroxy-3,5-pregnadien-20-one.

No. references cited.